Aug. 30, 1966 G. ALTMAN 3,269,839
PHOTOGRAPHIC PRODUCT FOR DIRECT VIEWING
AND DIRECTIVE IMAGING
Filed Jan. 4, 1963 3 Sheets-Sheet 1

United States Patent Office 3,269,839
Patented August 30, 1966

1

3,269,839
PHOTOGRAPHIC PRODUCT FOR DIRECT VIEWING AND DIRECTIVE IMAGING
Gerald Altman, 41 Westminster Road,
Newton Center, Mass.
Filed Jan. 4, 1963, Ser. No. 249,351
21 Claims. (Cl. 96—75)

The present invention relates to products associated with processes and devices for the projection of images and, more particularly, to the projection of an image by illumination returned from a generally opaque representation, viz. episcopic projection, rather than by illumination transmitted through a generally transparent representation, via diascopic projection.

In a typical episcopic projection system, a photographic print or other generally opaque representation is illuminated by light from an adjacent source and an optical image in terms of scattered light from the print is projected by a lens onto a viewing screen. Because the useful scattered light available is proportionately small, the illumination source must be intense and the projection lens aperture must be large. Although it is common experience that such a photographic print is capable of being viewed with ease, for the foregoing reasons its projection image often can be produced only at great inconvenience and expense.

In contrast, in the more usual diascopic projection system, condensed light from an illumination source is directed through a photographic transparencey (e.g. lantern slide or cinematographic film) or other generally transparent representation for projection by a lens onto a viewing screen. Because the useful condensed light available is relatively great, the illumination source intensity may be relatively moderate and the projection lens aperture may be relatively small. Although it is common experience that a transparency may be viewed directly only with difficulty, for the foregoing reasons its projection image ordinarily can be produced conveniently and inexpensively.

The primary object of the present invention is to provide products, related to processes and devices, involving episcopic projection of improved practicability by associating the representation, of which an image is to be projected, with a multiplicity of minute substantially reflex reflecting elements by which illumination incident upon the representation is re-directed with controlled or minimum dispersion toward the projection lens. As is well known, a reflex reflecting element may take the form either of: a catadioptic element, usually a sphere, having a forward lens surface for refracting incident radiation and a rearward reflecting surface for returning the radiation through the lens surface; or a corner reflector having three mutually perpendicular reflecting faces which cooperate to return a beam of incident radiation along its path of incidence. Both types of reflex reflecting elements have been termed retroreflectors. A feature of the foregoing retroreflector-representation association is that, if the retroreflecting elements are sufficiently small, they are practically unnoticeable when the representation is viewed directly but are capable nevertheless of a powerful retroreflective action when appropriately positioned with respect to an illumination source and a projection lens.

Another object of the present invention is to provide products, related to processes and devices, involving an

2 assemblage comprising a retroreflective stratum containing reflex reflecting elements, a photosensitive stratum that may be developed chemically or physically, and an antihalation stratum interposed therebetween. The antihalation layer prevents interaction of the retroreflective stratum and photosensitive stratum during photoexposure but disappears when the photosensitive stratum is developed.

A further object of the present invention is to provide products, related to processes and devices, involving the projection of visual copy as it is being prepared. This object of the present invention contemplates the effective projection of materials in preparation and use during educational lectures.

Other objects of the present invention will in part be obvious and will in part appear hereinafter.

The invention accordingly comprises the several components and steps and the interrelations among such components and steps, exemplified in the following detailed disclosure, the scope of which will be indicated in the appended claims. For a fuller understanding of the nature and objects of the present invention, reference should be had to the following detailed description taken in connection with the accompanying drawings, wherein:

Generally, projection of images in accordance with the present invention involves a projector and a representation (black-and-white or multi-color) in relative proximity within a unitary housing, and a relatively remote viewing screen, the representation being contiguously associated throughout its area with a multiplicity of minute retroreflecting elements. In conventional fashion, the representation and the viewing screen in optical theory occupy conjugate focal surfaces. The retroreflecting elements, generally no more than 0.1 inch in maximum extent and preferably no more than 0.01 inch in maximum extent, either are hemispherically-clear, hemispherically-metallized refracting spheres or are metallized cube corners. The source of illumination is associated with a beam splitter which, from an optical standpoint, positions the illumination source and the projection lens in coincidence with respect to the representation. The arrangement is such that divergent rays from the illumination source to the representation are returned as convergent rays from the representation to the projection lens. In consequence, even large representations are capable of effective illumination and projection by a light source and a projection lens, both of modest size.

Figure 1:
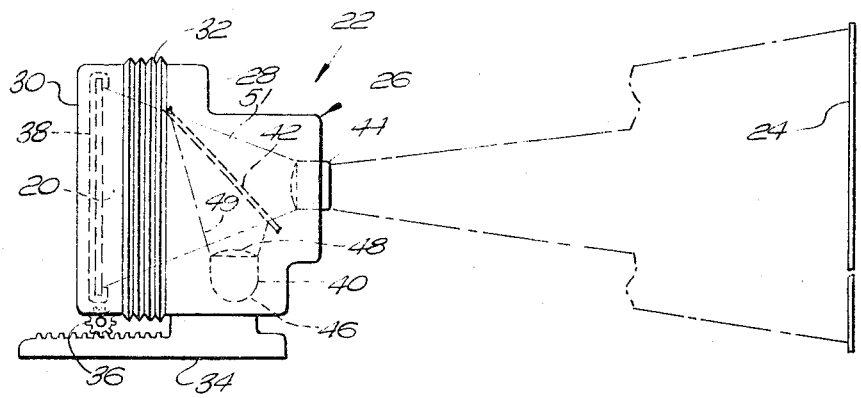
FIG. 1 is a side view, with interior components in dotted lines, of a photographic projection system involving the present invention.

The projecting system of FIG. 1, which is designed primarily for the photographic products of FIGS. 2 to 5, generally includes, in combination, a laminated photographic sheet 20 having a retroreflective representation, a projector 22 containing laminated photographic sheet 20, and a relatively remote projection screen 24 of the type having dispersed metallic particles, glass spheres or white pigment as an image viewing matrix. Projector 22 includes a unitary housing 26 having a forward portion 28 and a rearward portion 30 that are intermediately connected by a bellows 32 to provide a light-tight chamber therewithin. Forward portion 28 is mounted upon a stable base 34. Rearward portion 30 is movable on base 34, as by means of rack and pinion 36. Mounted on rearward portion 30 within the housing is a frame 38, by which photographic sheet 20 is positioned. The remaining components of projector 26, which are suitably affixed within forward portion 28, include an illumination source 40, a beam splitter 42 and an objective lens 44. Beam splitter 42, in the form for example of a half-silvered mirror, directs light from illumination source 40 to photographic sheet 20 to objective lens 44. Illumination source 40 includes a sealed lamp 46 containing a medial filament, a rearward reflector and a focusing lens 48, by which the solid angle of a diverging cone 49 of illumination is determined. The axis of illumination source 40 and the axis of objective lens 44 are at right angles to each other and at 45° angles to beam splitter 42, the arrangement being such that rays diverging as at 49 from source of illumination 40 toward photographic sheet 20, converge from photographic sheet 20 at at 51 toward objective lens 44. Preferably, the adjustment of illumination source 40 is such that the flux cross-section of radiation generated by the filament of lamp 46 and retroreflected by sheet 20 approximately fills the stop of lens 44. Preferably the adjustment of objective lens 44 is such that photographic sheet 20 is disposed in its focal surface. It is apparent that by properly adjusting rearward portion 30, images of larger or smaller photographic sheets 20 may be projected onto screen 24.

Figure 2:
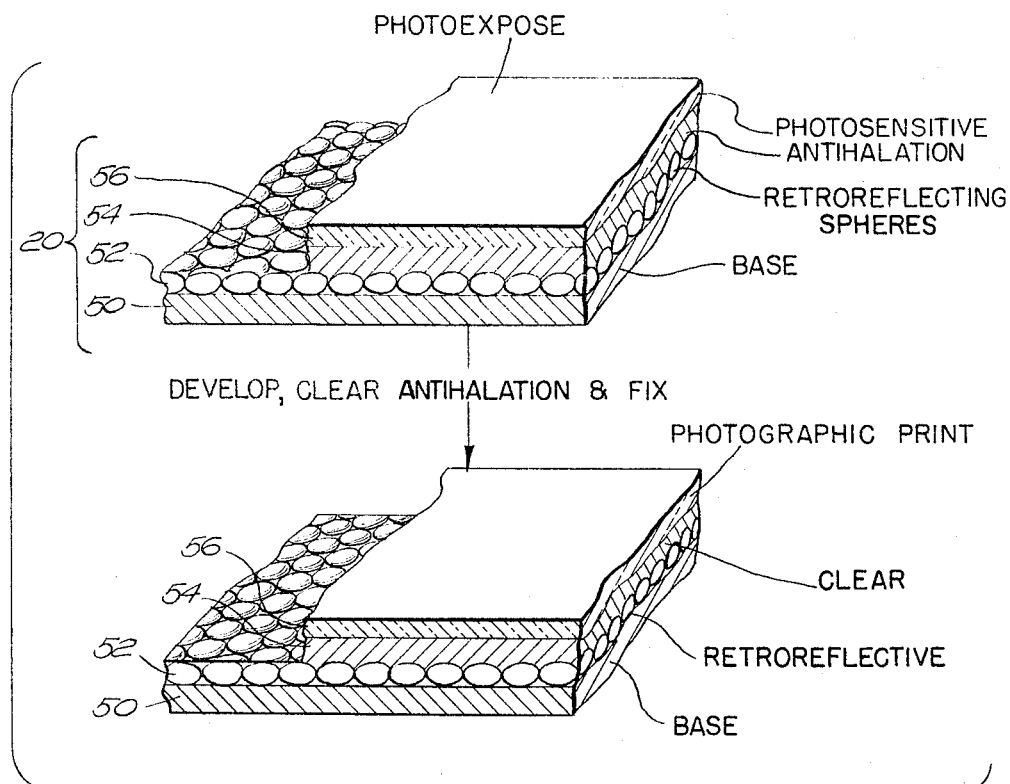
FIG. 2 illustrates, in exaggerated cross-section and perspective, a product undergoing a process, in accordance with the present invention.

Sheet 20 of FIG. 1, as shown in FIG. 2 comprises, in laminated sequence, an opaque base stratum 50, a retroreflective stratum 52 containing a multiplicity of minute retroreflecting elements, an initially opaque antihalation stratum 54 and a photosensitive stratum 56. Photoexposure of photosensitive stratum 56 produces a latent image therein, retroreflection from retroreflective stratum 52 being prevented by antihalation stratum 54. Development of photosensitive stratum 56 produces a visible print in stratum 56 and clears antihalation stratum 54. This print has the usual characteristic (HandD) curve (density plotted against log exposure), having transverse upper and lower extreme portions that are outwardly and oppositely directed and a generally oblique intermediate portion, the slope of which is designated by gamma.

Figure 2A:
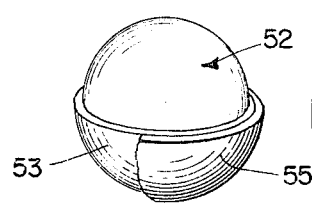
FIG. 2a illustrates, in exaggerated, broken-away perspective, an element of FIG. 2.

Details of the materials of the strata of sheet 20 are as follows. Base stratum 50 is composed either of paper, i.e. a felted sheet of cellulosic fibers, or plastic, for example, a cellulosic polymer such as cellulose nitrate, cellulose propionate or cellulose butyrate. Retroreflective stratum 52 is composed of minute glass spheres that are hemispherically transmitting and hemispherically reflecting, dispersed in a transparent lacquer, as disclosed in: U.S. Patent No. 2,997,403, issued August 22, 1961 in the name of Charles E. Seright for Reflex Reflective Coating Composition; and U.S. Patent No. 2,963,378, issued December 6, 1960 in the name of Philip V. Palmquist for Glass Beads Hemispherically Reflectorized With Metallic Coating and Compositions Thereof. Preferably, such spheres (FIG. 2a) are characterized by one hemispheric portion which is clear and the other hemispheric portion which is coated first at 53 with a metal, such as aluminum, and second at 55 with a paint, such as titanium dioxide lacquer, which covers the outer surface of the metal. Antihalation stratum 54 is composed of a polar acting dye which clears in acid or alkali, for example, phenophthalene, Acid blue black (Color Index 246) or Acid magenta (Color Index 692), dispersed in a polymer, for example, an ester such as cellulose acetate. Suitable antihalation compositions are disclosed in U.S. Patent No. 2,322,006, issued on June 15, 1943, in the name of Scheuring S. Fierke et al., for Photographic Filter and Antihalation Layer. Photosensitive stratum 56 is shown as being a silver halide emulsion. In such an emulsion, one or more of the silver halides, of which silver chloride, silver bromide and silver iodide are examples, are dispersed in a suitable colloidal material, such as gelatine, agar, albumin, casein, collodion or cellulosic ester. In use, photosensitive stratum 56, after photoexposure to provide a latent image, is developed by silver reduction and fixed by silver halide dissolution in an alkaline environment. The developer generally is alkali active, i.e. active only in alkaline solution, so that its development is accompanied by clearing of antihalation stratum 54. Examples of developers of this type are pyrogallol, hydroquinone, metol, amidol, para-aminophenol and glycin. The fixing agent, for example, is a silver halide solvent such as sodium thiosulfate or sodium thiocyanate. The alkali, for example, is an alkali metal base such as sodium or potassium hydroxide or a nitrogenous base such as ammonium hydroxide or hydroxylamine.

One specific example of the product and process of FIG. 2 involves the following. In the specific product of FIG. 2; stratum 50 is composed of baryta paper approximately 0.001 inch thick; retroreflective stratum 52 is composed of a multiplicity of hemispherically metallized, hemispherically clear glass microspheroids of the type shown in FIG. 2a, having diameters ranging from 10 to 50 microns and a refractive index of at least 1.8, dispersed within a clear melamine-formaldehyde polymer in a distribution that is approximately 0.001 inch thick; antihalation stratum 54, which is composed of an acid azo dye, Methyl red, dispersed in cellulose acetate, is approximately 0.001 inch thick; and silver halide stratum 56 is a moderateley high speed, gelatino iodobromide emulsion that is approximately 0.001 inch thick. After photoexposure to provide a latent image in photosensitive stratum 56, the foregoing specific product is processed in the following sequence of steps. The photoexposed product is developed in the following solution for 3 minutes at 20° C.

| | |
|---|---|
| Water _____cc__ | 3000 |
| Metol _____g__ | 3 |
| Sodium sulfite _____g__ | 44 |
| Hydroquinone _____g__ | 12 |
| Sodium carbonate _____g__ | 36 |
| Potassium bromide _____g__ | 2 |

During development the antihalation layer clears and a print becomes visible in the photosensitive stratum. After washing for 10 minutes, fixing is effected by immersion in the following solution for 5 minutes at 20° C.

| | |
|---|---|
| Water _____cc__ | 3000 |
| Sodium thiosulfate _____g__ | 240 |
| Sodium sulfite _____g__ | 15 |
| Acetic acid (28%) _____cc__ | 75 |
| Borax _____g__ | 14.5 |
| Potassium alum _____g__ | 15 |

After washing for 10 minutes and drying, the resulting print is of good quality for both direct observation and episcopic projection.

Figure 3:
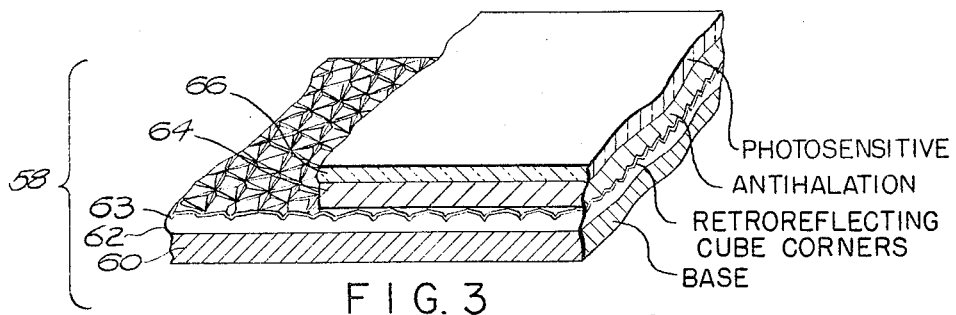
FIG. 3 is a view, in exaggerated cross-section and perspective, of another product of the present invention.

The product of FIG. 3, shown generally at 58, includes, in laminated sequence, a support stratum 60, a retroreflective stratum 62, an antihalation stratum 64 and a photosensitive stratum 66. Support stratum 60, antihalation stratum 64 and photosensitive stratum 66 are like their counterparts at 50, 54 and 56 in FIG. 1. Retroreflective stratum 62, which is composed of any suitable one of the plastic materials referred to above, presents a multiplicity of minute cube corners, which are embossed in stratum 62 and metallized as at 63. In a specific example of a process involving the product of FIG. 3, details of the materials and steps are identical to those of the foregoing specific example of FIG. 2, except that base stratum 60 is omitted and retroreflective stratum 62, composed of glass or methyl methacrylate approximately ¼ inch thick, presents cube corners, approximately ⅛ inch in maximum extent, that are metallized with a coat of aluminum approximately 0.001 inch thick.

It will be understood that in other embodiments of the invention, the gelatino silver halide of photosensitive strata 56 and 66 of FIGS. 2 and 3 are replaced by other photosensitive materials, for example: a ferric composition capable of being developed by potassium ferrocyanide; a diazo material capable of being developed by an alkali; a bichromated material capable of being differentially hardened and dyed; a photopolymerizable material capable of being differentially polymerized by incident light, as in U.S. Patent No. 2,948,611, issued on August 9, 1960, in the name of Arthur L. Barney for Photopolymerizable Compositions, Elements and Processes; a photothermographic material capable after photoexposure of being developed by heat, as in U.S. Patent No. 2,095,839, issued on October 12, 1937, in the name of Samuel E. Sheppard, et al., for Photothermographic Composition; or a phototropic material capable of being differentially darkened by light without development, as in U.S. Patent No. 2,953,454, issued on September 20, 1960, in the name of Elliot Berman for Phototropic Data Storage Capsules and Base Coated Therewith.

A particularly pertinent thermographic process is disclosed in U.S. Patent No. 3,046,128, issued on July 24, 1962, in the name of Robert J. Klinkowski et al. for Thermally Developable Diazotype Photoprinting Material and Production Thereof. In one product embodying the form of FIG. 2, photosensitive stratum 56 contains a diazo compound, e.g. diazotized p-amino-N,N-dimethylaniline, antihalation stratum 54 contains the acid dye, Methyl red, dispersed in cellulose acetate in sufficient quantity to produce opacity, retroreflective stratum 52 contains retroreflective spheres, e.g. of the type described above in connection with FIG. 2 dispersed at the lower face of antihalation stratum 54, base stratum 50 is composed of paper, the under free face of which is coated with a composition containing: water—100 ml.; 30% aqueous colloidal silica, 0.015 micron particle size—25 ml; urea—125 g.; guanidine carbonate—50 g.; butadiene-styrene (weight ratio, 40:60) copolymer aqueous emulsion, 48% solids—50 ml. After photoexposure, heating of the product causes transmission of alkali vapor through base stratum 50 and, consequently, development of photosensitive stratum 56 and clearing of antihalation stratum 54.

In another alternative embodiment of the present invention, the product of either FIG. 2 or FIG. 3 is developed and fixed by a so-called diffusion transfer reversal process of the type disclosed in U.S. Patent No. 2,543,181, issued on February 27, 1951, in the name of Edwin H. Land for Photographic Product Comprising a Rupturable Container Carrying a Photographic Processing Liquid. In accordance therewith, the product of either FIG. 2 or FIG. 3 is processed by spreading an aqeuous alkaline solution of a silver halide developer and a silver halide solvent between the product and a receiving sheet. Silver is developed in the photosensitive stratum to produce a negative print and a silver halide complex, formed at the photosensitive stratum, migrates to the receiving sheet to produce a positive print. In one modification of this form of the invention, a retroreflective stratum of the type shown in FIG. 2 or FIG. 3 is provided in the receiving sheet. In another modification of this form of the invention, retroreflecting microspheroids are spread from the container with the processing solution for association with the receiving sheet after photoexposure and during processing.

Figure 4:
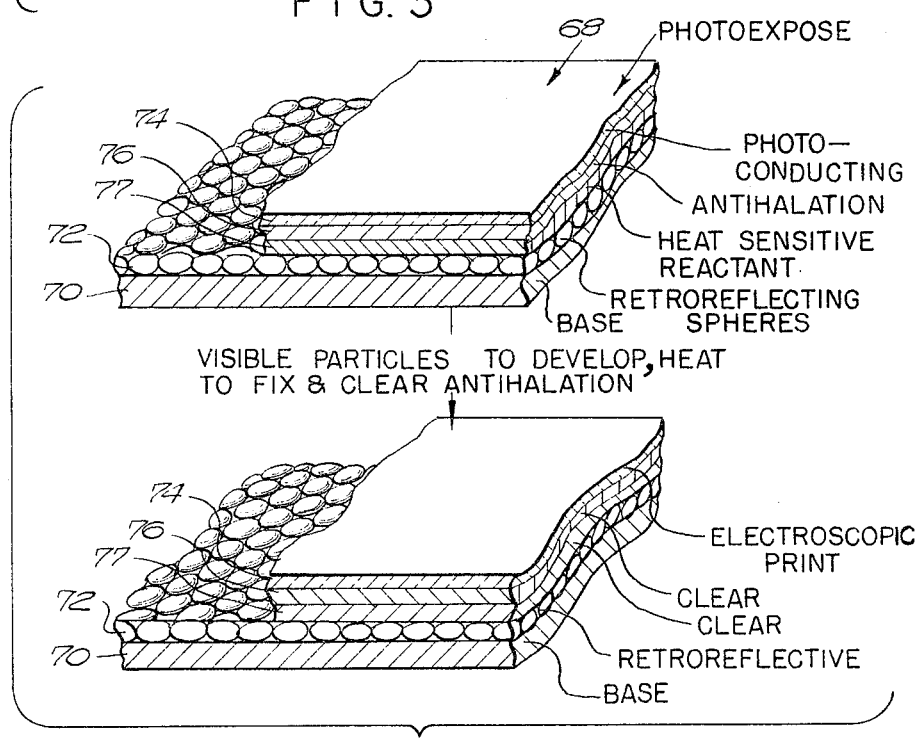
FIG. 4 illustrates, in exaggerated cross-section and perspective, another product undergoing another process, in accordance with the present invention.

FIG. 4 discloses a sheet 68 of a type useful in electrophotography. Sheet 68 includes, in laminated sequence, a base stratum 70, a catadioptric retroreflective stratum 72, a heat sensitive reactant stratum 77, an antihalation stratum 76 and a photoconductive stratum 74. The associated process involves charging photoconductive stratum 74 uniformly, photoexposing photoconductive stratum 74 to produce a differential electrostatic image, subjecting the electrostatic image to a developer powder, and heating the product in order to fix the powder to the photoconductive stratum and to cause heat sensitive reactant stratum to clear antihalation stratum 76.

Photoconductive stratum 74, for example, contains as a photoconductor: a photoconductive oxide, sulfide, selenide, telluride or iodide of cadmuim, mercury, antimony, bismuth, thallium, molybdenum, aluminum, lead or zinc; or arsenic trisulfide, cadmium arsenide, lead chromate or selenium. Photoconductive stratum 74, for example, contains as a vehicle: an electrically insulating, film forming polymer, having high dielectric constant and high dielectric strength such as polyvinyl alcohol, hydroxyethyl cellulose, carboxymethyl cellulose, gum arabic or guar gum. The thickness of photoconductive stratum 74 is not critical but preferably ranges between 0.0003 to 0.002 inch. The relative proportions of photoconductor to vehicle range between 1:1 and 9:1. With respect to the remainder of this product, antihalation stratum 76, heat reactant stratum 77, retroreflective stratum 72 and base stratum are analagous to their counterparts in FIGS. 2 and 3. Specifically useful electrophotographic compositions and steps are disclosed in: U.S. Patent No. 2,939,787, issued June 7, 1960, in the name of Edward C. Giaimo, Jr., for Exposure of Photochemical Compositions; and U.S. Patent No. 2,993,787, issued July 25, 1961, in the name of Meyer L. Sugarman, Jr., for Electrostatic Printing.

Figure 5:
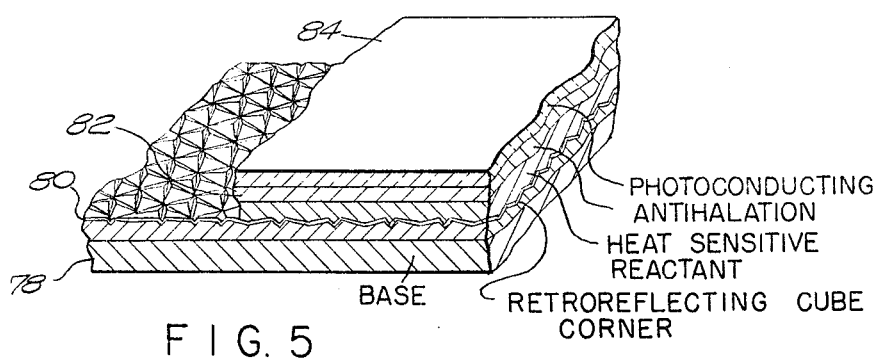
FIG. 5 is a view, in exaggerated cross-section and perspective, of a further product of the present invention.

The product of FIG. 5, like the product of FIG. 4 capable of producing an electrostatic image, comprises, in laminated sequence, an electrically conducting support stratum 78, a retroreflective stratum 80, an antihalation stratum 82 and a photoconductive stratum 84. The strata are identical to corresponding strata of FIG. 4, except that retroreflective stratum 80 is like corresponding stratum 62 of FIG. 3 and the reactant to clear antihalation stratum 82 is applied from an external source.

In a specific example of the compositions and steps of FIGS. 4 and 5, the base stratum 70 and retroreflective stratum 72 are identical to their counterparts in FIGS. 2 and 3. Antihalation stratum 76 is composed of Methyl red. Photoconductive stratum 68, 0.0005 inch thick, is composed of a blend of: 5 g. of polyvinyl alcohol; and 100 g. of C.P. photoconductive zinc oxide. Photoconductive stratum 68 is charged and exposed in conventional fashion. A cloud of developer powder consisting of 200 mesh powdered zinc is directed toward photoconductive stratum 68 in order to produce a visible print. Fixing is effected with a light spray of a solution of polyvinyl alcohol in water (5% polyvinyl alcohol and 95% water, by total weight). Clearing of antihalation stratum is effected by aqueous ammonia vapor.

In another specific example of the compositions and steps of FIGS. 4 and 5, the product consists merely of: a base stratum, 0.001 inch thick, composed of black paper; and a photoconductive stratum, 0.005 inch thick, composed of a blend of 5 g. polyvinyl alcohol and 100 g. of C.P. photoconductive zinc oxide. Photoconductive stratum is electrostatically charged and photoexposed in conventional fashion. Development is effected with a cloud of hemispherically reflecting, hemispherically-clear minute spheroids that are in the general range of 200 mesh. These spheroids are of the type shown in FIG. 2a, the outer surface of the reflecting portion, which is coated with a metal, such as aluminum, being coated additionally with a paint, such as titanium dioxide lacquer. Fixing is effected in conventional fashion, for example, by spraying with a transparent lacquer, such as polyvinyl alcohol in acetone. As viewed directly by an observer, the resulting print is in terms of light scattered from a white pigment on a dark background, since normally any incident light theoretically capable of being retroreflected to the eyes of the observer is blocked by the observer's head. On the other hand, projection in the apparatus of FIG. 1 results in the production of an episcopic image in accordance with the present invention. In a multicolored image of this type the refracting composition of the spheroids and their backings are of appropriate additive or subtractive colors. In a print of this type, the retroreflective spheroids are distributed in gradually varying concentration per unit area, thereby being characterized by a curve, of density v. log exposure, that is similar to the analogous curve of the product of FIG. 2.

Figure 6:
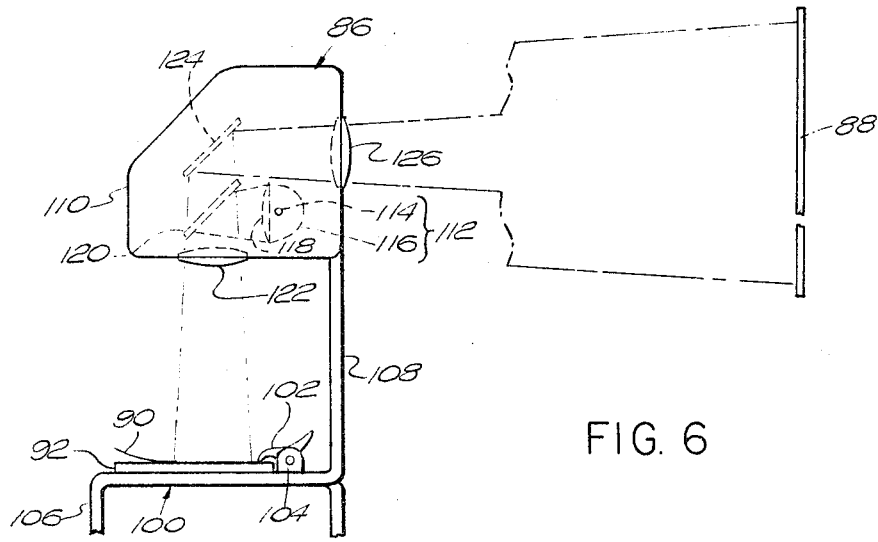
FIG. 6 is a side view, with interior components in dotted lines, of an alternative projection system involving the present invention.
Figure 7:
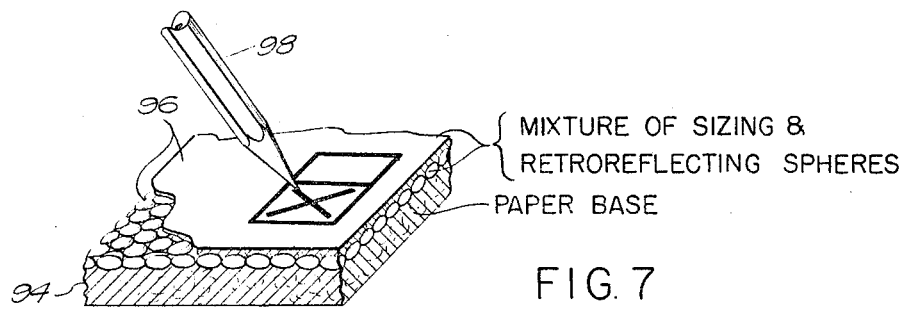
FIG. 7 illustrates, in exaggerated cross-section and perspective, another product of the present invention.

FIG. 6 illustrates a novel episcopic system by which subject matter may be projected onto a viewing screen 88 as it is being written or printed by a lecturer, record keeper or other operator on the exposed sheet 90 of a block 92 of sheets. Each sheet 90, as is shown in FIG. 7, comprises a base stratum 94 composed of paper and a coating 96 of retroreflective microspheres dispersed in a surfacing material such as zein or clay. In typical fashion, imprinting is effected by a graphite pencil 98 or the like.

Block 92 is positioned on an exposed and accessible table 100 by a clip 102 which retains the block in position by a suitable spring (not shown). Table 100 is supported by suitable legs 106. Positioned above table 100 by arms 108 in a housing 110 within which the illuminating and projecting components are enclosed and supported. These components include a source of illumination 112 in the form of a sealed beam lamp containing a filament 114, a reflector 116 and a lens 118. A beam splitter 120 directs divergent light from source of illumination 112 through lens 122 to retroreflective image bearing sheet 90. Lens 122 directs convergent light through beam splitter 120 for deflection by a mirror 124 through an objective lens 126 toward screen 88.

Figure 8:
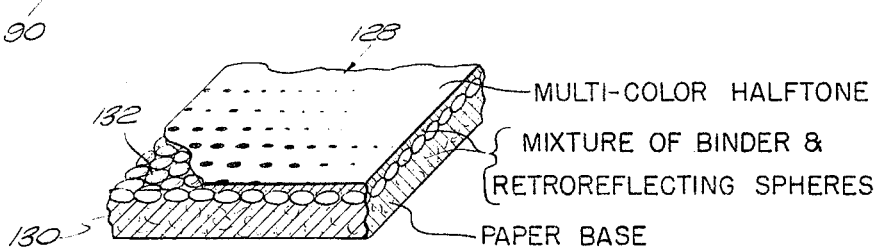
FIG. 8 illustrates, in exaggerated cross-section and perspective, a further product of the present invention.
Figure 9:
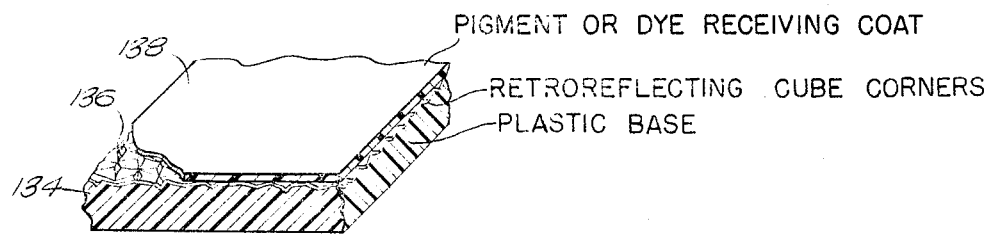
FIG. 9 illustrates, in exaggerated cross-section and perspective, another product of the present invention.

FIGS. 8 and 9 illustrate modifications of the product of FIG. 7. The product of FIG. 8 includes a paper base 130 and a mixture 132 of binder and glass microspheres, analogous in all respects to their counterparts in FIG. 7. On the surface of stratum 132 are imprinted red, green and blue halftone dots for the direct observation and episcopic projection, in the apparatus of FIG. 6, of multicolor halftone prints. The product of FIG. 9 includes: a plastic base 134, into which are embossed metallized cube corners 136; and a pigment or dye receiving coat 138. In one example, plastic base 134 is composed of methyl methacrylate, cube corners 136 are reflectorized with a thin silver film and coat 138 is a depolymerized polymer, such as polyvinyl chloride. Alternately coat 138 is a polymer having microscopic pores or striations or coat 138 includes an abrasive such as carbon powder.

The present invention thus provides products, related to processes and devices, for the episcopic projection of representations in an efficacious and practicable manner. Since certain changes may be made in the above described product, processes and devices without departing from the scope of the invention herein involved, it is intended that all matter, contained in the above description and shown in the accompanying drawings, shall be interpreted in an illustrative and not in a limiting sense.

What is claimed is:

1. A photographic product comprising, in combination, a photosensitive stratum and a substantially reflex reflecting stratum, said photosensitive stratum being constituted by means for photoexposure to an optical image defined by actinic radiation for the production of a photographic print, said reflex reflecting stratum constituted by a multiplicity of minute reflex reflecting elements for optical communication contiguously with said photographic print, said multiplicity of minute reflex reflecting elements each inherently including means for acquiring incident radiation from substantially any one of a multiplicity of inward directions and means for redirecting resulting radiation in substantially the opposite one of a multiplicity of outward directions for the purpose of establishing a selected substantially common path for an incident beam of said radiation directed toward said representation and for a resulting beam of said radiation, said path characteristically being substantially dependent upon the direction of said incident beam and characteristically being substantially independent of the angle of incidence between said incident beam and said product.

2. A photographic product comprising image receiving laminar means and illumination controlling laminar means, said image receiving laminar means being composed of a photosensitive composition for the production of a representational print, said illumination controlling laminar means being composed of a multiplicity of minute substantially reflex reflecting increments characterized by a forward surface and a rearward surface, said forward surface and said rearward surface being oppositely curved, said forward surface constituting lens means for the acquisition of said illumination, and mirror means in contiguity with said rearward surface for the redirection of said illumination, said acquisition and said redirection inherently occurring along a substantially common path substantially irrespectively of the orientation of said product.

3. A photographic product comprising image receiving laminar means and illumination controlling laminar means, said image receiving laminar means being composed of a photosensitive composition for the production of a representational print, said illumination controlling laminar means being composed of a multiplicity of minute substantially reflex reflecting increments characterized by means providing mirror facets disposed in three intersecting planes for the acquisition and redirection of illumination on said print, said acquisition and said redirection inherently occurring along a substantially common path substantially irrespectively of the orientation of said product.

4. A photographic product comprising a stratum of photosensitive composition and a stratum of minute optical spheres, said photosensitive composition being characterized by reception of a latent image when photoexposed for development to a visible print, certain portions of said optical spheres constituting lens means, and mirror means in contiguity with other portions of said optical spheres, said optical spheres acquiring and redirecting radiation illuminating said print.

5. A photographic product comprising a stratum of photosensitive composition and a stratum having a multiplicity of minute corner reflectors, said photosensitive composition being characterized by reception of a latent image when photoexposed for development to a visible print, said corner reflectors being characterized by three intersecting reflective faces for the acquisition and redirection of illumination on said print.

6. A photographic product comprising a stratum of photosensitive silver halide composition and a stratum having a multiplicity of minute optical spheres, said photosensitive silver halide composition being characterized by reception of a latent image, when photoexposed, for development to a visible print, certain portions of said optical spheres constituting lens means, and mirror means in contiguity with other portions of said optical spheres, said optical spheres acquiring and redirecting radiation illuminating said print.

7. A photographic product comprising a stratum of photosensitive silver halide composition and a stratum having a multiplicity of minute corner reflectors, said photosensitive silver halide composition being characterized by reception of a latent image, when photoexposed, for development of a visible print, said corner reflectors being characterized by three intersecting reflective faces for the acquisition and redirection of radiation incident on said visible print.

8. A photographic substantially flat and substantially flexible sheet comprising, in laminated sequence, a stratum of photosensitive gelatino silver halide composition having a characteristic curve of density versus log exposure, a stratum of opaque masking composition containing an acid active dye, a stratum of minute glass spheres of optically clear composition having communicating lens and mirror surfaces, said stratum of photosensitive gelatino silver halide composition being constituted to receive a latent image when photoexposed to actinic radiation, said latent image being constituted to form a visible print and said opaque masking composition being constituted to become optically clear when simultaneously subjected to an aqueous alkaline environment containing a silver halide developer, said minute spheres being constituted for the acquisition and redirection of radiation incident on said visible print, and an opaque support stratum for said visible print.

9. A substantially flat and substantially flexible photographic sheet comprising, in laminated sequence, a stratum of photosensitive gelatino silver halide composition having a characteristic curve of density versus log exposure, a stratum of opaque masking composition containing a pH active dye, a stratum of minute reflex reflecting corner reflectors substantially in the form of reentrant cube corners having three reflective faces disposed in intersecting planes, said stratum of photosensitive gelatino silver halide composition being constituted to receive a latent image when photoexposed to actinic radiation, said latent image being constituted to form a visible print and said opaque masking composition being constituted to become optically clear when simultaneously subjected to an aqueous alkaline environment and a silver halide developer, said cube corners being constituted for the acquisition and redirection of radiation incident on said visible print, and an opaque support stratum for said visible print.

10. A photographic sheet comprising electrophotosensitive means for acquiring an electrical pattern defining a representation, and a multiplicity of minute spheres in contiguity therewith, certain portions of said optical spheres constituting lens means, mirror means being in contiguity with other portions of said optical spheres, said optical spheres acquiring and redirecting radiation illuminating said print.

11. A photographic sheet comprising electrophotosensitive means for acquiring an electrical pattern defining a representation, and a multiplicity of minute corner reflectors in contiguity therewith, said corner reflectors being characterized by three intersecting reflective faces for the acquisition and redirection of illumination on said print.

12. The photographic product of claim 4 wherein said photosensitive composition contains a diazo material capable of development by an alkali.

13. The photographic product of claim 4 wherein said optical spheres are composed of glass.

14. The photographic product of claim 5 wherein said photosensitive composition contains a diazo material capable of development by an alkali.

15. The photographic product of claim 4 wherein said photosensitive composition is selected from the class consisting of silver halide material, ferric material, diazo material, bichromated material, photopolymerizable material, photothermographic material and phototropic material.

16. The photographic product of claim 5 wherein said photosensitive composition is selected from the class consisting of silver halide material, ferric material, diazo material, bichromated material, photopolymerizable material, photothermographic material and phototropic material.

17. The photographic product of claim 2 wherein said image receiving laminar means has an electrostatic pattern thereon.

18. The photographic product of claim 3 wherein said image receiving laminar means has an electrostatic pattern thereon.

19. The photographic product of claim 2 wherein said image receiving laminar means is photoconductive.

20. The photographic product of claim 3 wherein said image receiving laminar means is photoconductive.

21. A photographic product comprising photosensitive stratum means, receiving stratum means, reflex reflecting stratum means and processing fluid means, said photosensitive stratum means constituting means for being photoexposed in order to produce a latent image, said processing fluid means constituting means for developing said photosensitive stratum means and for diffusion transferring a print to said receiving stratum means, said reflex reflecting stratum means being contiguous with said print, said reflex reflecting stratum means including a multiplicity of minute reflex reflecting elements each inherently including means for acquiring incident radiation from substantially any one of a multiplicity of inward directions and means for redirecting resulting radiation in substantially the opposite one of a multiplicity of outward directions for the purpose of establishing a selected substantially common path for an incident beam of said radiation directed toward said representation and for a resulting beam of said radiation, said path characteristically being substantially dependent upon the direction of said incident beam and characteristically being independent of the angle of incidence between said incident beam and said product.

References Cited by the Examiner

UNITED STATES PATENTS

| | | | |
|---|---|---|---|
| 957,502 | 5/1910 | Dupuis | 88—24 |
| 1,707,157 | 3/1929 | Berthon | 96—81 |
| 1,961,348 | 6/1934 | Goedtler | 96—79 |
| 2,230,572 | 2/1941 | Mestre | 88—24 |
| 2,317,550 | 4/1943 | Ormond | 88—24 |
| 2,322,006 | 6/1943 | Fierke et al. | 96—84 |
| 2,403,752 | 7/1946 | Phillippi | 88—82 X |
| 2,437,924 | 3/1948 | Wright | 96—79 |
| 2,481,770 | 9/1949 | Nadeau | 96—84 |
| 2,499,452 | 3/1950 | Bonnett | 88—1 |
| 2,646,364 | 7/1953 | Porth | 106—193 X |
| 2,668,126 | 2/1954 | Taylor et al. | 117—36 |
| 2,690,967 | 10/1954 | Sharples | 96—79 |
| 2,726,154 | 12/1955 | Land | 96—81 |
| 2,742,833 | 4/1956 | Evans et al. | 96—79 |
| 2,760,863 | 8/1956 | Plambeck | 96—84 |
| 2,805,159 | 9/1957 | Unkauf | 96—75 |
| 2,809,294 | 10/1957 | Vyverberg | 96—1 |
| 2,848,327 | 8/1958 | Eichorn | 96—75 |
| 2,856,535 | 10/1958 | Vyverberg | 96—1 |
| 2,896,507 | 7/1959 | Mast et al. | 88—61 |
| 2,942,972 | 6/1960 | Charlton | 96—27 |
| 2,957,766 | 10/1960 | Woodacre | 96—27 |
| 2,977,226 | 3/1961 | Land | 96—29 |
| 3,002,835 | 10/1961 | Kostelec | 96—1 |
| 3,035,912 | 5/1962 | Le Massena et al. | 96—27 |
| 3,079,253 | 2/1963 | Greig | 96—1 |
| 3,087,382 | 4/1963 | De Nygorden | 88—26 |
| 3,095,301 | 6/1963 | Kostelec et al. | 96—1 |
| 3,222,986 | 12/1965 | Altman | 88—24 |

FOREIGN PATENTS 891,992    3/1962    Great Britain.

(Other references on following page)

OTHER REFERENCES

Merriam, "Webster's New International Dictionary," 2nd Edition, Unabridged, 1941, page 420, column 2; and page 2129, column 3 relied on.

References Cited by the Applicant
UNITED STATES PATENTS

| | | |
|---|---|---|
| 1,854,864 | 4/1932 | Semenitz. |
| 2,016,333 | 10/1935 | Leeds. |
| 2,647,849 | 8/1953 | Douglas. |
| 2,713,286 | 7/1955 | Taylor. |
| 2,977,850 | 4/1961 | Vanstrum. |
| 3,053,137 | 9/1962 | Loepfe. |

OTHER REFERENCES

"Illumination Engineering Society Lighting Handbook," Third Ed., pub. by The Illuminating Engineering Society, 345 E. 47th St., New York, N.Y. (1962). Pages relied on: first (title) page; second page entitled "Illuminating Engineering Society"; pp. 3–10 and 3–11.

NORMAN G. TORCHIN, *Primary Examiner.*

A. L. LIBERMAN, D. D. PRICE, *Assistant Examiners.*